(12) United States Patent
Yaroshenko et al.

(10) Patent No.: US 11,991,946 B2
(45) Date of Patent: May 28, 2024

(54) ADAPTIVELY ADJUSTING PARAMETERS OF EQUIPMENT OPERATING IN UNPREDICTABLE TERRAIN

(71) Applicant: Mineral Earth Sciences LLC, Mountain View, CA (US)

(72) Inventors: Sergey Yaroshenko, Newark, CA (US); Gabriella Levine, San Francisco, CA (US); Elliott Grant, Woodside, CA (US); Daniel Ribeiro Silva, San Jose, CA (US); Linda Kanu, Pleasanton, CA (US); Francis Ebong, San Francisco, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 235 days.

(21) Appl. No.: 17/485,928

(22) Filed: Sep. 27, 2021

(65) Prior Publication Data
US 2023/0102576 A1    Mar. 30, 2023

(51) Int. Cl.
*A01B 79/00* (2006.01)
*A01B 63/00* (2006.01)
(Continued)

(52) U.S. Cl.
CPC .......... *A01B 79/005* (2013.01); *A01B 63/002* (2013.01); *G06N 3/02* (2013.01); *G06V 20/188* (2022.01)

(58) Field of Classification Search
CPC ...... A01B 79/005; A01B 63/002; G06N 3/02; G06V 20/188; G06Q 10/063; G05D 1/0246
See application file for complete search history.

(56) References Cited

U.S. PATENT DOCUMENTS 8,666,241 B2    3/2014  Cameron et al.
8,754,929 B1    6/2014  Prince
(Continued)

OTHER PUBLICATIONS

European Patent Office; International Search Report and Written Opinion of Application No. PCT/US2022/031713; 11 pages; dated Sep. 13, 2022.

(Continued)

*Primary Examiner* — Manuel A Rivera Vargas
(74) *Attorney, Agent, or Firm* — Gray Ice Higdon

(57) ABSTRACT

Implementations are disclosed for adaptively adjusting various parameters of equipment in unpredictable terrain, such as agricultural fields. In various implementations, edge computing device(s) may obtain a first image captured by vision sensor(s) transported across an agricultural field by a vehicle. The first image may depict plant(s) growing in the agricultural area. The edge computing device(s) may process the first image based on a machine learning model to generate agricultural inference(s) about the plant(s) growing in the agricultural area. The edge computing device(s) may determine a quality metric for the agricultural inference(s). While the vehicle continues to travel across the agricultural field, and based on the quality metric: the edge computing device(s) may trigger one or more hardware adjustments to one or more of the vision sensors, or one or more adjustments in an operation of the vehicle.

20 Claims, 7 Drawing Sheets

(51) Int. Cl.
  *G06N 3/02* (2006.01)
  *G06V 20/10* (2022.01)

(56) References Cited

U.S. PATENT DOCUMENTS

| | | | |
|---|---|---|---|
| 9,237,331 B2 | 1/2016 | Heinzle et al. | |
| 10,694,686 B2* | 6/2020 | Xu | A01G 22/00 |
| 10,937,193 B2 | 3/2021 | Hu et al. | |
| 2020/0019777 A1* | 1/2020 | Gurzoni, Jr. | G06V 10/803 |
| 2020/0120267 A1* | 4/2020 | Stelmar Netto | G06V 20/188 |
| 2021/0158041 A1 | 5/2021 | Chowdhary et al. | |
| 2022/0092705 A1* | 3/2022 | Khait | G06V 20/188 |

OTHER PUBLICATIONS

Heinzle et al., "Computational Stereo Camera System with Programmable Control Loop" ACM Transactions on Graphics, vol. 30, Issue 4, Jul. 2011, Article No. 94, pp. 1-10. Retrieved from https://doi.org/10.1145/2010324.1964989.

Adams et al., "The Frankencamera: An Experimental Platform for Computational Photography" Communications of the ACM. vol. 55, No. 11. Dated Nov. 2012.

Paul et al., "CamTuner: Reinforcement-Learning based System for Camera Parameter Tuning to enhance Analytics" arXiv:2107.03964v1 [cs.LG] dated Jul. 8, 2021.

Agarwal et al., "Perception System for Autonomous Driving" Carnegie Mellon The Robotics Institute. Dated May 6, 2017. 36 pages.

Todd Vorenkamp, "The Benefits for Using Auto Modes on Your Digital Camera" B&H Explora. Retrieved from https://www.bhphotovideo.com/explora/photography/tips-and-solutions/benefits-using-auto-modes-your-digital-camera. Dated Sep. 1, 2021. 4 pages.

Sheng et al., "Deep Reinforcement Learning-Based Task Scheduling in IoT Edge Computing." Sensors 2021, 21, 1666. Retrieved from https://doi.org/10.3390/s21051666.

Zhang et al., "Resource Allocation for a UAV-Enabled Mobile-Edge Computing System: Computation Efficiency Maximization" IEEE Access. Digital Object Identifier. https://doi.10.1109/ACCESS.2019.2935217. Dated Aug. 28, 2019. 10 pages.

Binas et al., "Reinforcement Learning for Sustainable Agriculture" in Proceedings of the International Conference on Machine Learning Workshop, 2019.

Nassar et al., "Reinforcement Learning-based Resource Allocation in Fog RAN for IoT with Heterogeneous Latency Requirements" arXiv:1806.04582v2 [cs.NI] dated Jan. 15, 2019. 11 pages.

Meng et al., "Power Allocation in Multi-User Cellular Networks: Deep Reinforcement Learning Approaches" arXiv: 1901.07159v1 [cs.IT] Dated Jan. 22, 2019. 29 pages.

Yan et al., "Offloading and Resource Allocation with General Task Graph in Mobile Edge Computing: A Deep Reinforcement Learning Approach" arXiv:2002.08119v1 [cs.NI] dated Feb. 19, 2020. 31 pages.

Liakos et al., "Machine Learning in Agriculture: A Review" Sensors. 2018. 18, 2674; doi:10.3390/s18082674. 29 pages.

Baek et al., "Heterogeneous Task Offloading and Resource Allocations via Deep Recurrent Reinforcement Learning in Partial Observable Multi-Fog Networks" arXiv:2007.10581v1 [cs.DC] dated Jul. 21, 2020. 16 pages.

Zhan et al., "Deep Reinforcement Learning-Based Offloading Scheduling for Vehicular Edge Computing" IEEE Internet of Things. Dated May 26, 2020. 28 pages.

\* cited by examiner

ADAPTIVELY ADJUSTING PARAMETERS OF EQUIPMENT OPERATING IN UNPREDICTABLE TERRAIN

BACKGROUND

Various types of sensors may be carried across areas such as agricultural fields in order to gather sensor data that can be used to make a variety of different inferences, including agricultural inferences. For example, vision sensors may be mounted to a tractor or other agricultural vehicle and transported across a field in order to capture images of plants. These captured images may be processed using techniques such as artificial intelligence and machine learning to generate various inferences, such as visual annotations, fruit/ vegetable count estimates, crop yields, disease detection, plant health assessment, etc.

The accuracy and/or value of these inferences may depend in part on the quality and consistency of these captured images. However, some environments, such as agricultural fields, remote terrain, etc., may be highly unpredictable. The terrain may include any number of bumps, ruts, or slopes. And in the agricultural context, crops grown in the agricultural field may vary in size and/or shape. Moreover, some vision sensors may be integrated with modular sensor packages that can be mounted virtually anywhere on a vehicle (e.g., a tractor, an irrigation pivot), introducing additional variability and/or noise into the captured images.

SUMMARY

Implementations are described herein for adaptively adjusting various parameters of equipment operating in unpredictable terrain. More particularly, but not exclusively, implementations are described herein for adaptively adjusting various parameters of vision sensors or the vehicles that carry them, in response to environmental and/or human-induced factors. These adjustments may enable the capture of higher-quality and/or more consistent images of unpredictable terrain, such as agricultural fields and the crops grown in those fields. This improved image quality and/or consistency may in turn lead to improved quality of inferences drawn from those images.

In some implementations, a method may be implemented using one or more edge computing devices, and may include: obtaining, by one or more of the edge computing devices, a first image captured by one or more vision sensors transported across an agricultural field by a vehicle, wherein the first image depicts one or more plants growing in the agricultural area; processing, by one or more of the edge computing devices, the first image to generate one or more agricultural inferences about one or more of the plants growing in the agricultural area, wherein the processing is based on a machine learning model; determining, by one or more of the edge computing devices, a quality metric for the one or more agricultural inferences using one or more of the edge computing devices; and while the vehicle continues to travel across the agricultural field, and based on the quality metric: triggering, by one or more of the edge computing devices, one or more hardware adjustments to one or more of the vision sensors, or triggering, by one or more of the edge computing devices, an adjustment in an operation of the vehicle, such as a change in a velocity vector.

In various implementations, one or more of the agricultural inferences may include a visual annotation that labels a plant feature in the first image. In various implementations, the quality metric may be determined based on a spatial dimension of the visual annotation. In various implementations, the quality metric may be determined based on a deviation of the spatial dimension from an expected spatial dimension of the plant feature.

In various implementations, the quality metric may be determined based on a deviation of one or more of the agricultural inferences from a trajectory of agricultural inferences. In various implementations, the deviation from the trajectory may be determined based on a recurrent neural network.

In various implementations, the one or more vision sensors may include a stereoscopic camera, and one or more of the hardware adjustments may include altering an interaxial distance (also referred to as "interaxial separation" or "interocular distance") between lenses of the stereoscopic camera. In various implementations, one or more of the hardware adjustments may include an adjustment of: an optical zoom of one or more of the vision sensors; a framerate of one or more of the vision sensors; an aperture size of one or more of the vision sensors; or an exposure speed of one or more of the vision sensors.

In various implementations, the change in operation of the vehicle may be a reduction in speed. In various implementations, the change in operation of the vehicle may include stopping and reversing the vehicle, and the method may further include: triggering one or more adjustments to a given vision sensor of the one or more vision sensors; obtaining a second image captured by the given vision sensor subsequent to the stopping and reversing of the vehicle, wherein the second image depicts one or more of the same plants growing in the agricultural area; and processing the second image based on the machine learning model to generate one or more updated agricultural inferences about one or more of the plants growing in the agricultural area.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
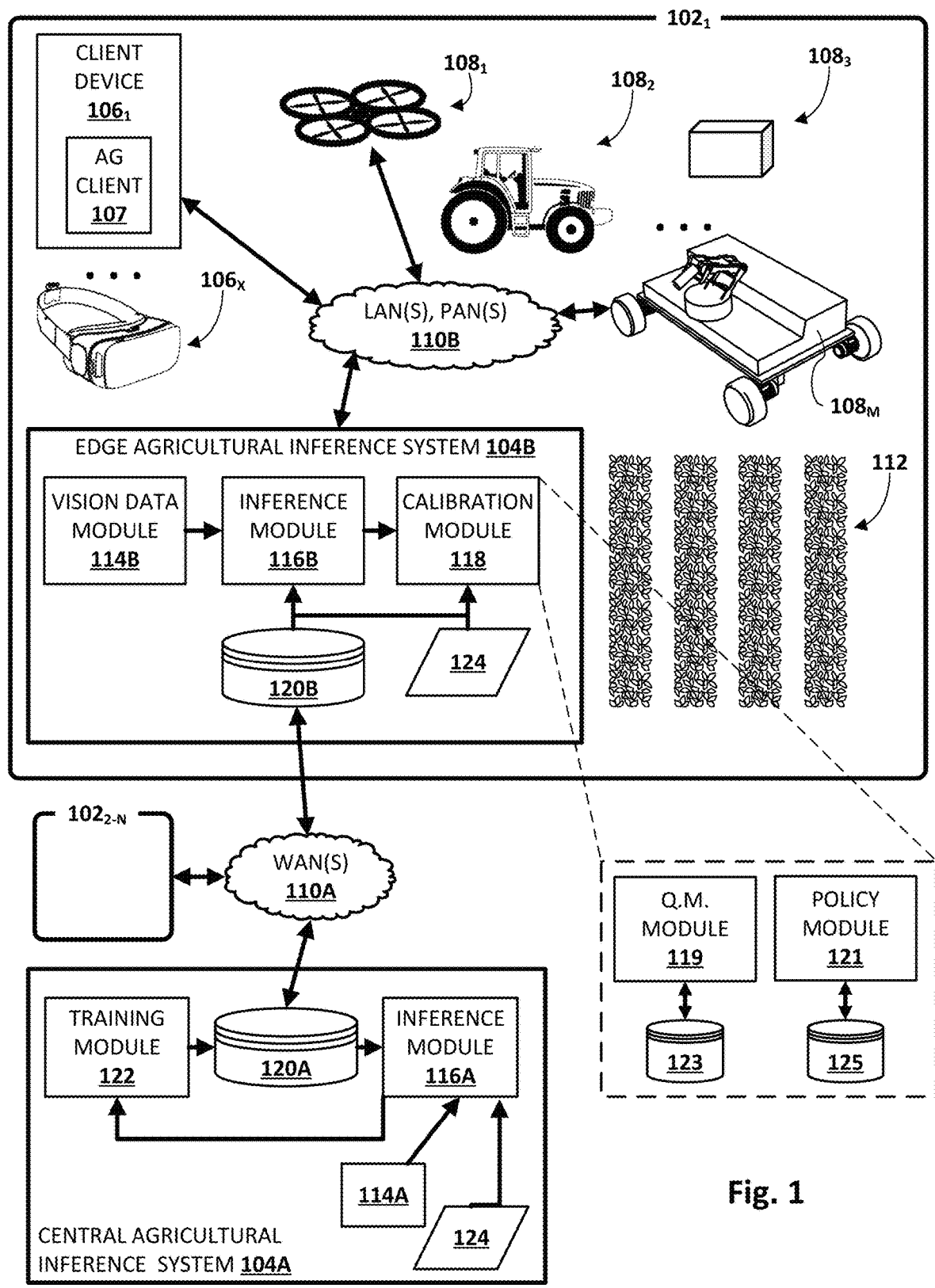
FIG. 1 schematically depicts an example environment in which disclosed techniques may be employed in accordance with various implementations.

Implementations are described herein for adaptively adjusting various parameters of equipment operating in unpredictable terrain. More particularly, but not exclusively, implementations are described herein for adaptively adjusting various parameters of vision sensors or the vehicles that carry them, in response to environmental and/or human-induced factors. These adjustments may enable the capture of higher-quality and/or more consistent images of unpredictable terrain, such as agricultural fields and the crops grown in those fields. This improved image quality and/or consistency may in turn lead to improved quality of inferences drawn from those images.

In various implementations, a vehicle such as a robot, tractor, harvester, irrigation pivot, unmanned aerial vehicle (UAV), etc., may be operated to transport one or more sensors across unpredictable terrain, such as an agricultural field. These sensors may take various forms, including vision sensors such as RGB cameras, X-ray vision sensors, infrared vision sensors, vision sensors with depth capabilities (e.g., RGBd cameras, stereoscopic cameras, light detection and ranging (LIDAR) sensors), etc., or other types of sensors such as thermometers, hydrometers, soil testing sensors, etc. In various implementations, one or more of the vision sensors may capture a temporal sequence of images that depict, for instance, crops being grown in the agricultural field.

The temporal sequence of images may be processed using various types of machine learning models to draw various agricultural inferences. These agricultural inferences may include, but are not limited to, visual annotations such as bounding shapes or pixel-wise annotations (segmentation) that identify objects such as whole plants (e.g., plants of a particular type or infested with a particular disease/pest) or constituent plant-parts of interest (e.g., fruit, vegetables, flowers, nuts, berries, etc.). Additionally or alternatively, these agricultural inferences may include, for instance, predictions such as crop yield estimates, estimated counts of various plant-parts-of-interest, statistics, and so forth.

Once the agricultural inference(s) are generated, they may be evaluated to determine one or more quality metrics that appraise the value or reliability of the inferences. Various types of quality metrics may be determined depending on the nature of the agricultural inference (or the task that yields the inference), the nature of the machine learning model used to generate the inference, the nature of the vision sensor(s) used to capture the underlying images, features or traits of the plants being evaluated, etc. In some implementations, the quality metric may include or take into account a confidence measure that is already assigned to an inference generated based on the machine learning model.

In some implementations, the quality metric may be determined based on a deviation of one or more agricultural inferences from an expected value or trajectory of agricultural inferences. As one example, if an estimated fruit count for a particular plant decreases dramatically from a first image taken on a first day and a second image taken on a second day, it might be the case that some of the fruit were eaten by pests. However, it also may be the case that the entire plant was not captured in the second image, e.g., because the vision sensor was closer to the plant on the second day. Consequently, the estimated fruit count for that plant on the second day may be assigned a relatively negative quality metric. As another example, if bounding boxes generated around detected fruit on the same plant grow or shrink dramatically from one day to the next, a similarly negative quality metric may be determined. As yet another example, if an inference that relies on a distance between a stereoscopic camera and an object is assigned low confidence, it might be the case that one or more parameters of the stereoscopic camera are in need of recalibration.

A deviation of one or more agricultural inferences from a trajectory of agricultural inferences may be determined in various ways. In some implementations, linear regression analysis may be used to find the line or linear combination that most closely fits a plurality of agricultural inferences. The extent to which a new agricultural inference drawn from a new image deviates from this line may or may not suggest a problem with how the new image was captured.

In other implementations, a machine learning model configured to process time-series data, such as a recurrent neural network (RNN), transformer model, etc., may be used to iteratively process a sequence of inputs, such as temporal sequence of images of a given plant (in which case the RNN may or may not take the form of a convolutional RNN), as well as other time-series data such as environmental conditions (e.g., ambient light, cumulative rainfall, high/low temperatures, etc.) or stewardship parameters (e.g., applied fertilizer, applied herbicides or pesticides, irrigation, tillage practice, etc.). Various types of RNNs may be employed, such as a long short-term memory (LSTM) or gated recurrent unit (GRU) model, as well as other types of models, such as transformer models. During each iteration of the RNN, the output may include a prediction for the next iteration. This prediction may be, for instance, a spatial dimension of a bounding box that is expected to encompass the plant or a constituent plant-part-of-interest in the next image. The extent to which the corresponding spatial dimension ultimately determined for the next image differs from this prediction may suggest a problem with how the next image was captured.

Whatever form the quality metric takes, in various implementations, it may be used to adjust various parameters of vision sensors or the vehicles that carry them. With regard to vision sensors, the quality metric may trigger one or more hardware adjustments to one or more vision sensors. For example, an interaxial distance between lenses of a stereoscopic camera (also referred to as "interaxial separation" or "interocular distance") may be adjusted to improve quality of depth-based imagery, and in turn, inferences generated from therefrom. As additional examples, a quality metric may trigger adjustment of an optical zoom of one or more of the vision sensors, a framerate of one or more of the vision sensors, an aperture size of one or more of the vision sensors, and/or an exposure speed of one or more of the vision sensors, to name a few.

In some implementations, the quality metric may trigger an adjustment to one or more light sources, such as turning it on or off, adjusting a brightness, or even adjusting a wavelength of light it emits. Similarly, the quality metric may trigger a wavelength adjustment to one or more of the vision sensors. For example, suppose an image depicting an oat plant is annotated with a low-confidence bounding box in an area that appears likely to contain crown rust. One or more infrared sensors may be activated and/or one or more vision sensors may be adjusted to capture infrared data. The resulting infrared images may better capture the crown rust, and consequently, may yield higher quality inferences (e.g., bounding boxes, pixel-wise annotations) identifying crown rust.

Operation of the vehicle that carries the vision sensor(s) may also be influenced based on quality metrics. For example, if the vehicle is travelling too fast, the images may be blurry, resulting in low-confidence visual annotations of plants or plant-parts-of-interest. Accordingly, in some implementations, the quality metric may trigger an adjustment in the velocity of the vehicle. This may include a change in direction, a change in speed, or any combination thereof.

For example, suppose a captured image is assigned a negative quality metric. This may trigger the vehicle to stop and reverse so that a given vision sensor that captured the low-quality image can attempt to capture a higher-quality image. In some implementations, this may include making one or more adjustments to the given vision sensor that captured the image. Once so adjusted, the given vision sensor may capture a second image that depicts one or more of the same plants. The second image may then be processed based on the same machine learning model used to process the first image to generate one or more updated agricultural inferences about one or more of the plants growing in the agricultural area. Due to the adjustment of the given vision sensor, these updated agricultural inferences likely will be higher quality than the original inferences (although that can be verified by calculating a new quality metric).

In some implementations, reinforcement learning may be employed to train a policy that can be used to select actions associated with adjusting vision sensor parameter(s) and/or vehicular velocity. The input to such a policy may include a state. The state may include a variety of different data, such as current settings of vision sensor parameters, a current and/or planned velocity or trajectory of the vehicle, the image under consideration, one or more inferences generated from the image under consideration, a quality metric determined from those inferences, and/or other data such as environmental conditions (e.g., ambient light, cumulative rainfall, high/low temperatures, etc.) or stewardship parameters (e.g., applied fertilizer, applied herbicides or pesticides, irrigation, tillage practice, etc.).

The output of the policy may be, for instance, a probability distribution over a plurality of potential actions. Each action may represent an adjustment that can be made to a parameter of a vision sensor or to a velocity of the vehicle. A reward used to train such a model may include, for instance, a change in the quality metric between the current iteration and a future iteration. An improvement in the quality metric may yield a positive reward, whereas a decline in the quality metric may yield a negative reward or penalty. A longer-term reward may include, for instance, an inference that is drawn cumulatively and/or from a totality of inferences, such as a crop yield for an entire field. Such a longer-term reward may be distributed among a plurality of iterations of the policy, e.g., with the reward being weighted more heavily for more recent iterations.

FIG. 1 schematically illustrates an environment in which one or more selected aspects of the present disclosure may be implemented, in accordance with various implementations. The example environment includes a plurality of edge sites $102_{1-N}$ (e.g., farms, fields, plots, or other areas in which crops are grown) and a central agricultural inference system 104A. Additionally, one or more of the edge sites 102, including at least edge site $102_1$, includes an edge agricultural inference system 104B, a plurality of client devices $106_{1-X}$, human-controlled and/or autonomous farm equipment $108_{1-M}$, and one or more fields 112 that are used to grow one or more crops. Field(s) 112 may be used to grow various types of crops that may produce plant parts of economic and/or nutritional interest. These crops may include but are not limited to everbearing crops such as strawberries, tomato plants, or any other everbearing or non-everbearing crops, such as soybeans, corn, lettuce, spinach, beans, cherries, nuts, cereal grains, berries, grapes, and so forth.

One edge site $102_1$ is depicted in detail in FIG. 1 for illustrative purposes. However, as demonstrated by additional edge sites $102_{2-N}$, there may be any number of edge sites 102 corresponding to any number of farms, fields, or other areas in which crops are grown, and for which agricultural inferences such as crop yield predictions may be of interest. Each edge site 102 may include the same or similar components as those depicted in FIG. 1 as part of edge site $102_1$.

In various implementations, components of edge sites $102_{1-N}$ and central agricultural inference system 104A collectively form a distributed computing network in which edge nodes (e.g., client device 106, edge agricultural inference system 104B, farm equipment 108) are in network communication with central agricultural inference system 104A via one or more networks, such as one or more wide area networks ("WANs") 110A. Components within edge site $102_1$, by contrast, may be relatively close to each other (e.g., part of the same farm or plurality of fields in a general area), and may be in communication with each other via one or more local area networks ("LANs", e.g., Wi-Fi, Ethernet, various mesh networks) and/or personal area networks ("PANs", e.g., Bluetooth), indicated generally at 110B.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Central agricultural inference system 104A and edge agricultural inference system 104B (collectively referred to herein as "agricultural inference system 104") comprise an example of a distributed computing network in which the techniques described herein may be implemented. Each of client devices 106, agricultural inference system 104, and/or farm equipment 108 may include one or more memories for storage of data and software applications, one or more processors for accessing data and executing applications, and other components that facilitate communication over a network. The computational operations performed by client device 106, farm equipment 108, and/or agricultural inference system 104 may be distributed across multiple computer systems.

Each client device 106 (and in some implementation, some farm equipment 108), may operate a variety of different applications that may be used, for instance, to obtain and/or analyze various agricultural inferences (real time and delayed) generated using techniques described herein. For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds or polygon meshes representing various aspects of objects of interest, such as fruits of crops, weeds, crop yield predictions, etc. The wearer may interact with the presented data, e.g., using HMD input techniques such as gaze directions, blinks, etc.

Individual pieces of farm equipment $108_{1-M}$ may take various forms. Some farm equipment 108 may be operated at least partially autonomously, and may include, for instance, an unmanned aerial vehicle $108_1$ that captures sensor data such as digital images from overhead field(s) 112. Other autonomous farm equipment (e.g., robots) may include a robot (not depicted) that is propelled along a wire, track, rail or other similar component that passes over and/or between crops, a wheeled robot $108_M$, or any other form of robot capable of being propelled or propelling itself past crops of interest. In some implementations, different autonomous farm equipment may have different roles, e.g., depending on their capabilities. For example, in some implementations, one or more robots may be designed to capture data, other robots may be designed to manipulate plants or perform physical agricultural tasks, and/or other robots may do both. Other farm equipment, such as a tractor $108_2$, may be autonomous, semi-autonomous, and/or human-driven. Any of farm equipment 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, barometers (for local weather information), photodiodes (e.g., for sunlight), thermometers, etc.

Figure 2:
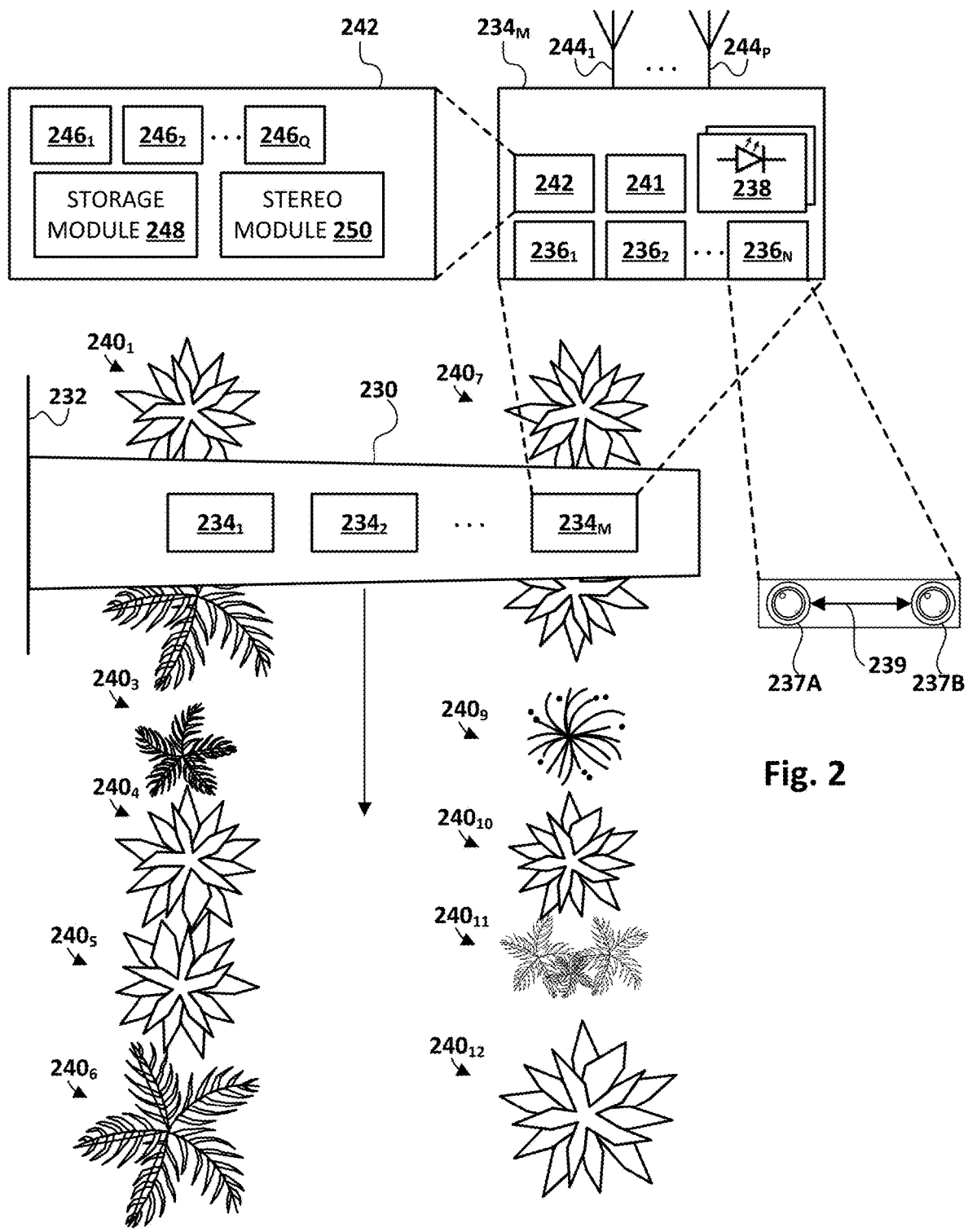
FIG. 2 depicts an example of how edge computing nodes configured with selected aspects of the present disclosure may be deployed in a field.

In some implementations, farm equipment 108 may take the form of one or more edge computing nodes $108_3$. An edge computing node $108_3$ may be a modular and/or portable data processing device that, for instance, may be carried through an agricultural field 112, e.g., by being mounted on another piece of farm equipment (e.g., on a boom affixed to tractor $108_2$ or to a truck) that is driven through field 112 and/or by being carried by agricultural personnel. In some cases, multiple edge computing nodes $108_3$ may be deployed on one farm vehicle or across multiple farm vehicles. Edge computing node $108_3$ may include logic such as processor(s), application-specific integrated circuits (ASICs), field-programmable gate arrays (FPGA), etc., configured with selected aspects of the present disclosure to capture and/or process various types of sensor data to make agricultural inferences. FIG. 2 schematically depicts one example of an edge computing node 234, and will be discussed in more detail shortly.

In some examples, one or more of the components depicted as part of edge agricultural inference system 104B may be implemented in whole or in part on a single edge computing node $108_3$, across multiple edge computing nodes $108_3$, and/or across other computing devices, such as client device(s) 106. Thus, when operations are described herein as being performed by/at edge agricultural inference system 104B, it should be understood that those operations may be performed by one or more edge computing nodes $108_3$, and/or may be performed by one or more other computing devices at the edge 102, such as on client device(s) 106.

In various implementations, edge agricultural inference system 104B may include a vision data module 114B, an edge inference module 116B, and a calibration module 118. Edge agricultural inference system 104B may also include one or more edge databases 120B for storing various data used by and/or generated by modules 114B, 116B, and 118, such as vision and/or other sensor data gathered by farm equipment $108_{1-M}$, agricultural inferences, machine learning models that are applied and/or trained using techniques described herein to generate agricultural inferences, and so forth. In some implementations one or more of modules 114B, 116B, and/or 118 may be omitted, combined, and/or implemented in a component that is separate from edge agricultural inference system 104B.

In various implementations, central agricultural inference system 104A may be implemented across one or more computing systems that may be referred to as the "cloud." Central agricultural inference system 104A may receive the massive sensor data generated by farm equipment $108_{1-M}$ (and/or farm equipment at other edge sites $102_{2-N}$) and process it using various techniques to make agricultural inferences. However, the agricultural inferences generated by central agricultural inference system 104A may be delayed (and are referred to herein as "delayed crop agricultural inferences"), e.g., by the time required to physically transport portable data devices (e.g., hard drives) from edge sites $102_{1-N}$ to central agricultural inference system 104A, and/or by the time required by central agricultural inference system 104A to computationally process this massive data.

In order to adaptively adjust parameters of agricultural equipment in real time or near real time based on agricultural inferences, those agricultural inferences may be needed more quickly than central agricultural inference system 104A can provide them. Accordingly, edge agricultural inference system 104B at edge site $102_1$ may be configured to generate inferences in situ, at the edge, so that these inferences can be evaluated (also in situ) to generate quality metrics that are then usable in real time (or near real time) to adjust various parameters of agricultural equipment.

Nonetheless, the delayed agricultural inferences made by central agricultural inference system 104A may be used for a variety of purposes, not the least of which is to train the machine learning models used by edge inference module 116B to generate inferences that can then be evaluated to adapt parameter(s) of agricultural equipment in real time or near real time. For example, central agricultural inference system 104A may include a training module 122, a central inference module 116A (which may share some characteristics with edge inference module 116B), and a central database 120A that stores one or more machine learning models. Central agricultural inference system 104A in general, and training module 122 and/or central inference module 116A in particular, may be configured to train those machine learning models (before and/or throughout their deployment) to generate agricultural inferences that are subject to quality evaluation using techniques described herein. To perform this training, training module and central inference module 116A may utilize sensor data generated by farm equipment $108_{1-M}$, e.g., alone and/or in concert with other data 124.

In some implementations, edge agricultural inference system 104B is able to generate agricultural inferences in real time or near real time because edge inference module 116B may selectively process less than all the massive sensor data generated by farm equipment $108_{1-M}$. In other words, the data processed in real time or near real time by edge inference module 116B may have a level of detail that is lower than, for instance, level(s) of detail the sensor(s) are capable of generating or that the sensor(s) actually generate. For example, in some implementations, data may be sampled, e.g., by vision data module 114B from one or more vision sensors onboard one or more farm equipment $108_{1-M}$, at a frequency and/or resolution that is lower than the data actually generated by those vision sensor(s). Alternatively, the vision sensors themselves may be operated at lower frequencies and/or resolutions than they are capable.

Whichever the case, the data may be applied, e.g., continuously and/or periodically by edge inference module 116B, as input across one or more machine learning models stored in edge database 120B to generate agricultural inferences that are indicative of, for instance, targeted plant trait(s) detected in/on one or more plants in the agricultural field 112. In some cases, one or more of these machine learning model(s) may be stored and/or applied directly on farm equipment 108, such as edge computing node $108_3$, to make an inference about plants within the agricultural field 112.

In some implementations, edge agricultural inference system 104B may selectively (e.g., on an "as needed" basis) download and/or install trained models that are stored in database 120A of central agricultural inference system 104A. For example, if edge inference module 116B determined, based on processing of vision data, that a particular plant trait is detected, edge agricultural inference system 104B may download new machine learning model(s) that are trained to make inferences related to that detected plant trait. As one example, inference module 116B may apply a machine learning model to vision data to detect, generically, the presence of plant disease, without detecting which specific plant disease(s) are present. On detection of potential disease, inference module 116B may request and/or download, from central agricultural inference system 104A, one or more machine learning models that are trained to detect specific types of plant disease. Edge inference module 116B may then apply these newly-obtained model(s) to the same vision data and/or to additional vision data (e.g., gathered further along the path of the vehicle, or from a prior location after the vehicle reverses course) to determine which specific plant diseases are present.

In contrast to edge agricultural inference system 104B, central inference module 116A may have the virtually limitless resources of the cloud at its disposal. Accordingly, central inference module 116A may apply all of the sensor data generated by farm equipment $108_{1-M}$ as input across machine learning model(s) stored in central database 120A to generate the delayed agricultural inferences described previously. And in some implementations, training module 122 may train the machine learning model(s) stored in database 120A based on a comparison of these delayed agricultural inferences to ground truth data (e.g., realized crop yields, human-observed disease or blight). Based on such a comparison, training module 122 may employ techniques such as back propagation, gradient descent, etc., to update the machine learning model(s) stored in central database 120A. The updated machine learning model(s) may subsequently be used by both edge inference module 116B and central inference module 116A to generate, respectively, real time and delayed agricultural inferences. In some implementations, edge agricultural inference system 104B may participate and/or contribute to training of machine learning models, e.g., by way of techniques such as federated learning. For example, edge agricultural inference system 104B may generate a local gradient that can then be incorporated into a central machine learning model along with other local gradients generated at other edge sites.

In some implementations, one or more components of edge agricultural inference system 104B, such as vision data module 114B and/or edge inference module 116B, may reduce computational complexity by processing a subset of high spatial/temporal/spectral resolution data to generate one or more image embeddings (or vectors). In some such implementations, this processing may include applying the subset of high resolution digital images as input across at least a portion of a machine learning module such as a CNN to generate the image embeddings/vectors. Using image embeddings may be more efficient than, for instance, counting individual crops, which may require 3D reconstruction from a point cloud, object tracking, etc. With image embeddings, it is possible to estimate the density of plant parts of interest (e.g., strawberries), rather than counting individual plant parts of interest. Density of plant parts of interest may be measured per plant, per meter, etc.

As noted previously, various types of machine learning models may be applied by inference modules 116A/B to generate various agricultural inferences. Additionally, various types of machine learning models may be used to generate image embeddings that are applied as input across the various machine learning models. These various models may include, but are not limited to, RNNs, LSTM networks (including bidirectional), transformer networks, feed-forward neural networks, CNNs, support vector machines, random forests, decision trees, etc.

Additionally, other data 124 may be applied as input across these models besides sensor data or embeddings generated therefrom. Other data 124 may include, but is not limited to, historical data, weather data (obtained from sources other than local weather sensors), data about chemicals and/or nutrients applied to crops and/or soil, pest data, crop cycle data, previous crop yields, farming techniques employed, and so forth. Weather data may be obtained from various sources other than sensor(s) of farm equipment 108, such as regional/county weather stations, etc. In implementations in which local weather and/or local weather sensors are not available, weather data may be extrapolated from other areas for which weather data is available, and which are known to experience similar weather patterns (e.g., from the next county, neighboring farms, neighboring fields, etc.). Alternatively, weather data may be predicted from other variables or features within the agricultural area.

In this specification, the term "database" and "index" will be used broadly to refer to any collection of data. The data of the database and/or the index does not need to be structured in any particular way and it can be stored on storage devices in one or more geographic locations. Thus, for example, database(s) 120A and 120B may include multiple collections of data, each of which may be organized and accessed differently.

Calibration module 118 may be configured to adjust various parameters of agricultural equipment in situ (e.g., while the agricultural vehicle moves through agricultural field 112) in real time or near real time based on inferences drawn generated by edge inference module 116B. As indicated by the arrows in FIG. 1, in some implementations, calibration module 118 may utilize machine learning model(s) stored in edge database 120B and/or other data 124 to determine whether and how to adjust agricultural equipment parameters.

Any number of agricultural parameters may be adjusted by calibration module 118 using techniques described herein. These parameters may include, for instance, operational parameters of the agricultural vehicle (e.g., robot, tractor) such as its velocity (including its direction of travel), speed, acceleration, chemicals applied, brake intensity, etc. Additionally or alternatively, these parameters may include, for instance, operational parameters of sensors such as vision sensors. Vision sensor parameters may include, for instance, optical zoom, a framerate, an aperture size, an exposure speed, an interaxial distance between lenses of a stereoscopic camera, a capture wavelength (e.g., RGB, infrared, X-ray), etc. Yet other agricultural equipment parameters that may be adjusted using techniques described herein include, but are not limited to, settings of one or more light sources such as color temperature, hue, intensity, brightness, lumen output, wavelength, and so forth.

In some implementations, calibration module 118 may include a quality metric ("Q.M" in FIG. 1) module 119 and a policy module 121. In other implementations, quality metric module 119 and policy module 121 may be combined, and/or one or the other may be omitted. Quality metric module 119 may be configured to evaluate inferences generated by edge inference module 116B and generate quality metrics based on those inferences. For example, quality metric module 119 may generate quality metrics that appraise or quantify the value or quality of inferences generated by edge inference module 116B. In some implementations, quality metric module 119 may rely on machine learning model(s) and/or other data stored in a quality metric database 123, which may or may not be part of edge database 120B. These machine learning model(s) may include, for instance, the time-series model 562 depicted in FIG. 5.

Policy module 121 may be configured to apply a policy, such as a machine learning model that is trained using various types of reinforcement learning, to a state to generate a probability distribution over an action space (e.g., a plurality of candidate actions). Policy module 121 may then select, and cause to be performed, one or more actions based on that probability distribution. The action space may include a plurality of candidate actions that can be performed to adjust any of the agricultural parameters mentioned previously. In some implementations, policy module 121 may select the n (positive integer) candidate actions having the n greatest probabilities, or those candidate actions having probabilities that exceed some threshold (e.g., a static threshold, standard deviation, etc.).

FIG. 2 depicts an example field of plants $240_{1-12}$. A boom 230 mounted to a vehicle 232 (mostly not visible in FIG. 2, e.g., a tractor, a robot, a truck, etc.) is being carried over plants $240_{1-12}$ as shown by the arrow to gather sensor data. Boom 230 may include, for instance, sprinklers for irrigation, sprayers for chemical application, etc. Also mounted on boom 230 are a plurality of edge computing nodes $234_{1-M}$ (which may share characteristics with edge computing node $108_3$ in FIG. 1) that are configured with selected aspects of the present disclosure. Although shown as boxes on top of the boom 230 in FIG. 2, edge computing nodes $234_{1-M}$ may alternatively be mounted at other locations of boom 230, such as on its sides or bottom. And while multiple edge computing nodes $234_{1-M}$ are depicted in FIG. 2, any number of edge computing nodes 234, such as a single edge computing node 234, may be deployed in similar fashions.

As shown by the called-out window at top right, edge computing node $234_M$ includes one or more sensors in the form of vision sensors $236_{1-N}$, one or more lights 238, a light controller 241, and logic 242 that is configured to carry out selected aspects of the present disclosure. Other edge computing nodes may or may not be similarly configured. Vision sensors $236_{1-N}$ may take various forms, and may or may not be the same as each other. These forms may include, for instance, an RGB digital camera, an infrared camera, a 2.5D camera, a 3D camera, and so forth. For example, vision sensor $236_N$ takes the form of a stereoscopic camera with two lenses 237A, 237B separated by an interaxial distance 239. One or more of these 2D vision sensors $236_{1-N}$ may capture images at various framerates (frames per second, or "FPS"), such as 30 FPS. In some implementations in which one or more of vision sensors $236_{1-N}$ captures 2.5D or 3D data, a point cloud having a resolution of, for instance, 640 px×480 px and/or a framerate of 10 FPS or greater may be implemented. In some implementations, vision sensor(s) 236 may capture 2D data and then generate 3D data (e.g., point clouds) using techniques such as structure from motion (SFM), stereo reconstruction, or dense optical flow 3D reconstruction, to name a few. In some implementations, one or more of vision sensors $236_{1-N}$ may be configured to capture vision data in a variety of different wavelengths, including but not limited to RGB, infrared, grayscale, X-ray, and so forth.

Light(s) 238 and light controller 241 may be configured to illuminate plants 240, e.g., in synch with operation of vision sensors $236_{1-N}$, in order to insure that the vision data that is captured is illuminated sufficiently so that it can be used to make accurate agricultural inferences. Light(s) 238 may take various forms, such as the light emitting diode (LED) depicted in FIG. 2, halogen lamps, incandescent lamps, infrared lamps, black lights, etc. In various implementations, light(s) 238 may be operated, e.g., by light controller 241, to emit various amounts and/or strengths of light (or more generally, electromagnetic radiation). For example, in some implementations, light(s) 238 may emit 14,000 lux of luminance or greater. In some such implementations, light controller 241 may also trigger vision sensors $236_{1-N}$ to acquire image data in sync with activation of light(s) 238.

Edge computing node $234_M$ also includes one or more wireless antenna $244_{1-P}$. In some implementations, each wireless antenna 244 may be configured to transmit and/or receive different types of wireless data. For example, a first antenna $244_1$ may be configured to transmit and/or receive Global Navigation Satellite System (GNSS) wireless data, e.g., for purposes such as localization and/or ROI establishment. Another antenna $244p$ may be configured to transmit and/or receive IEEE 802.12 family of protocols (Wi-Fi) or Long-Term Evolution (LTE) data. Another antenna 244 may be configured to transmit and/or receive 5G data. Any number of antennas 244 may be provided to accommodate any number of wireless technologies.

In some implementations, an edge computing node 234 may be capable of localizing itself within agricultural field 112 using various technologies. For example, the GNSS antenna $244_1$ may interact with satellite(s) to obtain a position coordinate. Additionally or alternatively, edge computing node 234 may use techniques such as inertial measurement units (IMU) that are generated by, for instance, sensor(s) integral with wheels (not depicted) of vehicle 232, accelerometer(s), gyroscope(s), magnetometer(s), etc. In yet other implementations, wireless triangulation may be employed. In some implementations, edge computing node 234 may be capable of localizing itself with an accuracy of 20 cm or less, e.g., at a frequency of 10 Hz or greater (or an IMU frequency of 100 Hz or greater).

Logic 242 may include various types of circuitry (e.g., processor(s), FPGA, ASIC) that is configured to carry out selected aspects of the present disclosure. For example, and as shown in the called-out window at top left in FIG. 2, logic 242 may include any number of tensor processing units (TPU) $246_{1-Q}$, a storage module 248, and a stereo module 250 (one or more graphical process units (GPU) and/or central processing units (CPU) may also be present, even if not depicted). In some implementations, four TPUs $246_{1-4}$ may be employed to process sensor data, e.g., in parallel, using four different machine learning models, e.g., at an inference frame rate per model of 20 FPS or greater.

Other configurations are possible. For example, instead of some number of TPUs, in some examples, an edge computing node 234 may include some number of GPUs, each with some number of cores. With the example operational parameters of edge computing node 234 described herein, in some examples, edge computing node 234 may be capable of being moved (or moving itself) at various speeds to perform its tasks, such as up to 12 m/s.

Storage module 248 may be configured to acquire and store, e.g., in various types of memories onboard edge computing node 234, sensor data acquired from one or more sensors (e.g., vision sensors $236_{1-N}$). In order to accommodate sensor input streams of, for instance, 1 GB/s, storage module 248 may, in some cases, initially write sensor data to a dedicated logical partition on a Non-Volatile Memory Express (NVMe) drive. Subsequently, e.g., after processing by inference module 116B, the sampled data may be copied to a Redundant Array of Inexpensive Disks (RAID) solid state drive for long-term storage. Stereo module 250 may be provided in some implementations in order to reconcile images captured by 2D vision sensors that are slightly offset from each other, and/or to generate 3D images and/or images with depth.

Figure 3:
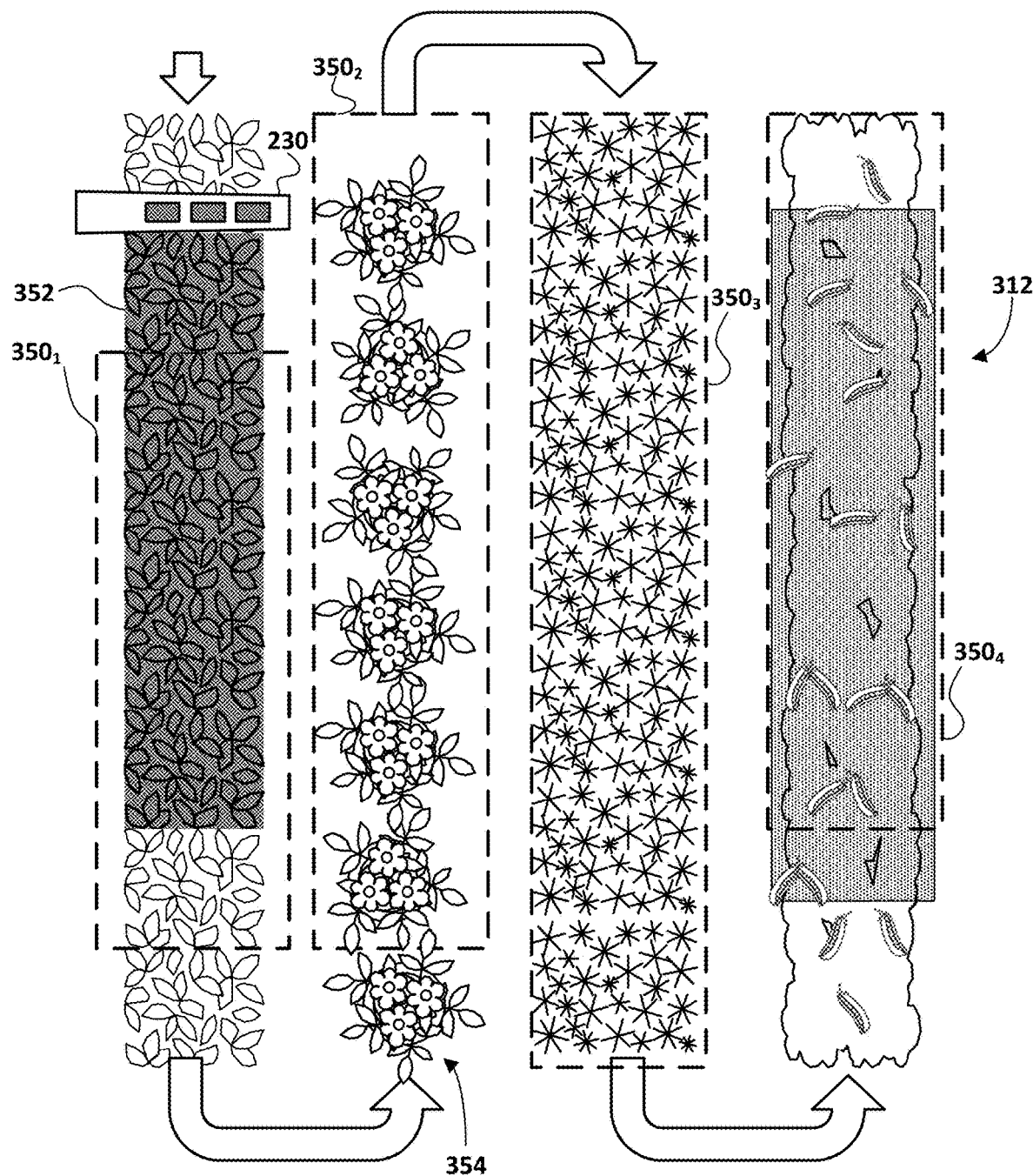
FIG. 3 schematically depicts examples of how techniques described herein may be implemented by an edge computing device to adapt parameters of agricultural equipment in situ.

FIG. 3 demonstrates an example of how techniques described herein may be performed to adaptively adjust parameters of agricultural equipment in situ, e.g., in a particular field 312. In FIG. 3, a plurality of edge computing nodes 234 are mounted on a boom 230 of a farm vehicle (not depicted). In FIG. 3, the farm vehicle is travelling such that boom 230 and edge computing nodes 234 are carried over four (vertical in FIG. 3) rows of plants. However, this is not meant to be limiting, and disclosed techniques may be performed with other types of agricultural equipment, such as agricultural robots, UAVs, etc.

Starting at top left, boom 230 (with three edge computing nodes onboard as indicated by the shaded rectangles) may be carried through field 312 along the trajectory shown by the arrows. Thus, boom 230 is first carried over the leftmost row from top to bottom, then is turned around and carried over the second row from bottom to top. Boom 230 is then turned around again and carried down over the third row, and once again is turned around and brought up over the fourth (rightmost row). To accomplish this, the farm vehicle (not depicted) to which boom 230 is attached may be traversed between the various rows.

The left-most row includes a first kind of plant, e.g., some variety of oats. As indicated by the shading, at position 352 of the left-most row, a plant disease is detected. For example, starting at position 352, the oats may be infected with crown rust. When boom 230 passes over position 352, edge inference module 116B may process the vision data captured by vision sensor(s) to generate an inference that suggests the presence of crown rust. However, this inference may receive a relatively low quality metric from quality metric module 119 because current configurations of vision sensor(s) 236 and/or light source(s) 238 of edge computing nodes 234 may be less adept at detecting crown rust than detecting other traits of oats, such as height, health, etc. Crown rust may be more reliably detected using an infrared vision sensor 236 and/or an infrared light source 238.

Accordingly, and based on this relatively low quality metric, one or more parameter(s) of vision sensor(s) 236, light source(s) 238 and/or the vehicle (not depicted) that carries them, may be adjusted at least temporarily to generate more reliable inferences of the presence of crown rust. For example, an infrared vision sensor 236 and/or light source 238 may be activated, e.g., by policy module 121, until such time that no more crown rust is detected. In FIG. 3, a first region of interest (ROI) $350_1$ is depicted that shows where these adjustments take effect (at the top of first ROI $350_1$) and where they end (at the bottom edge of first ROI $350_1$), e.g., in response to some exit condition. As indicated by the lack of shading, the bottom plant within first ROI $350_1$ is not infected with crown rust. In response to such an exit condition, the temporary adjustments made to vision sensor(s) 236, light source(s) 238 and/or the vehicle (not depicted) that carries them may be undone, e.g., by policy module 121, for the remainder of the left-most row. Exit conditions may take various forms and may be configured, for instance, by agricultural personnel. In the example of FIG. 3, the exit condition illustrated by first ROI $350_1$ is detection of some number of consecutive instances of uninfected plants. Other exit conditions are contemplated.

Boom 230 is then carried over the second-from-left row, upward along the page. In this row, a second ROI $350_2$ is established upon detection of a particular type of flowering plant 354. Second ROI $350_2$ may be tied off when, for instance, some number of consecutive instances of plants other than the flowering plant are detected, or at the end of the second-from-left row as depicted in FIG. 3. These flowering plants may have physical characteristics such as height, width, color, or other phenotypic traits that are best inferred when particular parameters of farm equipment are implemented. Quality metric module 119 may generate quality metrics based on various inferences drawn from vision data that captures the bottom plant in the second-from left row in FIG. 2. One or more of these quality metrics may indicate, for example, that one or more of the inferences is likely inaccurate, or at least has a low measure of confidence. Accordingly, one or more parameters of vision sensor(s) 236, light source(s) 238 and/or the vehicle (not depicted) that carries them may be adjusted, e.g., by policy module 121. Additionally or alternatively, edge inference module 116B operating on an edge computing node 234 may download, e.g., from central agricultural inference system 104A in real time, one or more machine learning models that are trained to detect various traits of the particular type of flowering plant.

In the third-from left row (travelling downward on the page), another ROI $350_3$ is established. Unlike first and second ROIs $350_{1-2}$, third ROI $350_3$ may be established based on knowledge that a third type of plant was planted in the third-from-left row previously, rather than based on quality metrics assigned by quality metric module 119 to inferences generated by edge inference module 116B. Based on this knowledge, based upon edge computing nodes 234 reaching a beginning (top) of the third-from left row (e.g., detected using localization techniques such as visual indicia, position coordinates, IMUs, etc.), and/or based on quality metric(s) generated by quality metric module 119, policy module 121 may adjust one or more parameters of vision sensor(s) 236, light source(s) 238 and/or the vehicle (not depicted) that carries them.

For example, the third-from-left row may include cover crops that are, for instance, relatively low to the ground. As a consequence, images generated by stereoscopic camera $236_N$ may be out-of-focus. This general lack of focus may be detected by quality metric module 119, in various ways, such as by observing low confidence score(s) associated with inferences about the cover crop, using a machine learning model that is trained to classify images as in focus or out-of-focus, etc. Accordingly, policy module 121 may make various adjustments, such as altering interaxial distance 239 between lenses 237A, 237B of stereoscopic camera $236_N$, in order to achieve better-focus and/or depth perception. If not already available in edge database 120B, edge inference module 116B may download, from central database 120A in real time, one or more machine learning models trained to detect trait(s) and/or presence of the particular type of cover crop.

In the right-most row (travelling upward on the page), a new type of plant (e.g., pea plant) is planted. In some implementations, based on this knowledge, policy module 121 may adjust one or more parameters of vision sensor(s) 236, light source(s) 238 and/or the vehicle (not depicted) that carries them. For example, if certain vision sensor parameters are known to be more effective in capturing useful vision data depicting peas, those parameters may be adjusted, e.g., by policy module 121. In some implementations, if edge database 120B doesn't already include a machine learning model (e.g., a CNN) that is trained to annotate pea pods (e.g., for counting purposes), edge inference module 116B may download the necessary model(s) from central database 120A.

In addition, as indicated by the shading, while travelling across the right-most row, at least a region of the row is subject to a different ambient light condition. For example, a cloud may be overhead while boom 230 passes over that region of the right-most row. Or perhaps there is a nearby structure or tree that casts a shadow on that region. Whichever the case, the ambient light condition is altered in that region, which may influence not only the quality of images captured in that area, but the quality of inferences generated by edge inference module 116B based on those inferences.

Accordingly, in various implementations, a fourth ROI 3504 may be established, e.g., upon detection of the change in ambient light from images captured in the shaded portion outside of and beneath fourth ROI 3504. For example, the quality of inferences generated by edge inference module 116B may decrease suddenly upon entering the shaded region. This may trigger quality metric module 119 to generate a low quality metric, which in turn may cause policy module 121 to make appropriate adjustments. These adjustments may include, for instance, turning on one or more light sources 238, increasing a brightness of one or more light sources, altering an exposure time of one or more vision sensors 236, etc.

Figure 4:
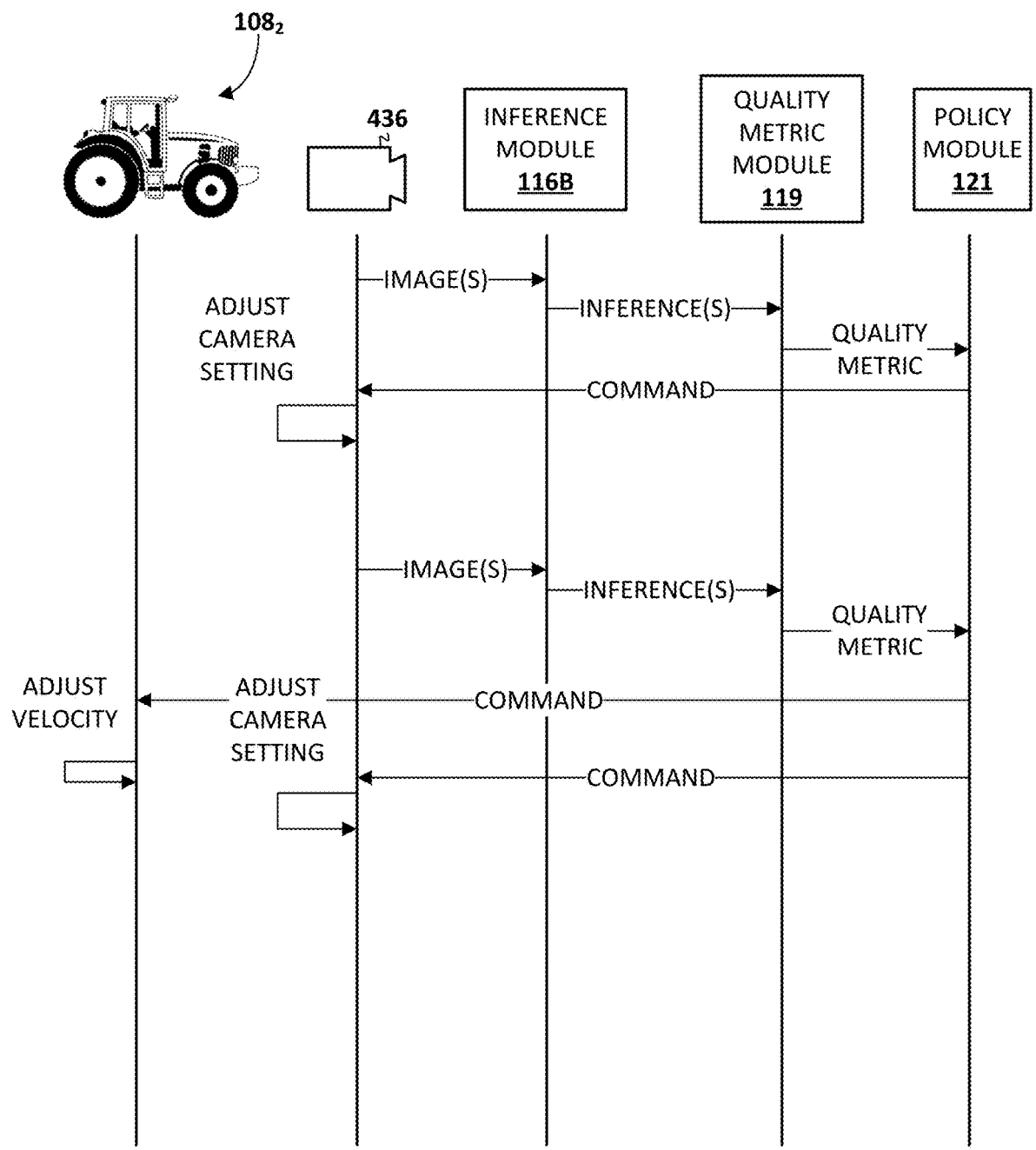
FIG. 4 schematically depicts an example of how various components described herein may exchange and process data to make agricultural inferences and adaptively adjust parameters of agricultural equipment.

FIG. 4 depicts two examples of how various components may cooperate to implement aspects of the present disclosure. In a first example starting at top, a vision sensor 436, which may or may not correspond to other vision sensors mentioned previously, may capture images and provide those images to edge inference module 116B, e.g., by way of vision data module 114B (not depicted in FIG. 4). Edge inference module 116B may process those images using one or more machine learning models to generate one or more inferences, which are provided to quality metric module 119. Quality metric module 119 may generate, and provide to policy module 121, a quality metric that quantifies a quality of those inferences. For example, if the inferences are associated with low confidences, quality metric module 119 may generate low quality metrics (which may be the low confidences themselves in some cases). Based on the quality metric and/or other additional information, policy module 121 may generate and issue one or more commands to vision sensor 436. Based on these commands, vision sensor 436 may adjust one or more parameters.

In the next example farther down FIG. 4, vision sensor 436 may provide more images to edge inference module 116B, which in turn may generate and provide more inferences to quality metric module 119. Based at least in part on those metrics, policy module 121 may once again generate one or more commands. However, in the second example, policy module 121 generates and sends commands to both vision sensor 436 and farm vehicle $108_2$ that carries vision sensor 436 across a field. Consequently, both vision sensor 436 and farm vehicle $108_2$ may adjust one or more parameters to improve inferences drawn by inference module 116B.

With farm vehicle $108_2$, these parameter adjustments may include an adjustment in velocity, which may include a change in speed and/or a change in direction. If the vehicle is autonomous or semi-autonomous, this command may be implemented automatically. If the vehicle is human-driven, the command may be conveyed to the driver audibly or visually. Depending on the circumstances, in some instances, farm vehicle $108_2$ may stop and reverse back over the same crops for which weak inferences were drawn by edge inference module 116B, so that vision sensor 436 can capture new images (e.g., with its own new parameter settings). In other instances where backing up to recapture those crops may not be worth the time or effort, farm vehicle $108_2$ may simply slow down so that images captured by vision sensor(s) are better suited for processing by edge inference module 116B. As one example, if edge inference module 116B is attempting to generate inferences (e.g., bounding boxes, annotated pixels) that identify relatively small plant-parts-of-interest, such as berries, buds, etc., it may be difficult to generate accurate inferences if farm vehicle $108_2$ is travelling too fast.

Figure 5:
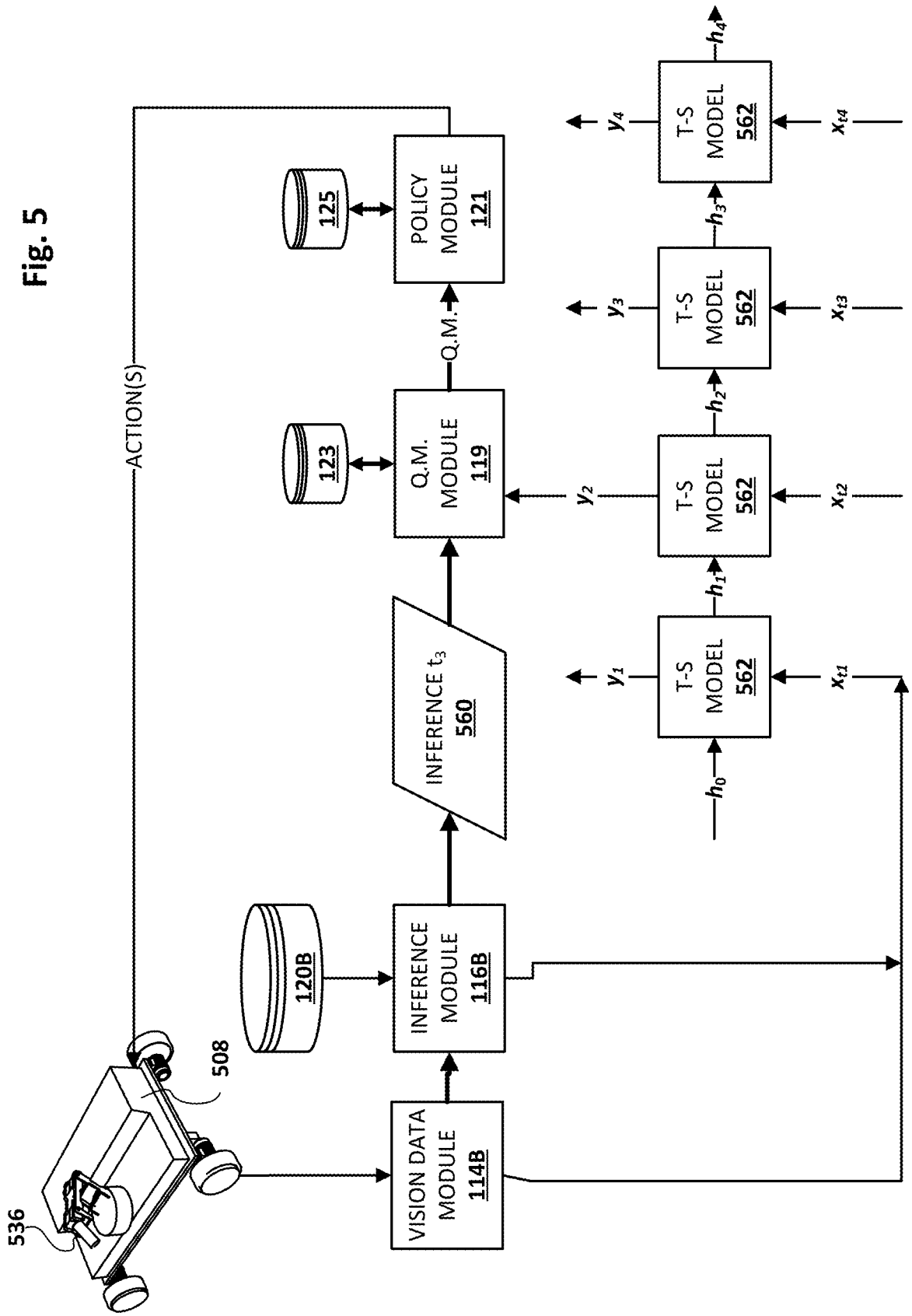
FIG. 5 schematically depicts another example of how various components described herein may exchange and process data to make agricultural inferences and adaptively adjust parameters of agricultural equipment.

FIG. 5 schematically depicts one example of how various components described herein may cooperate to adjust parameters of an agricultural robot 508. Agricultural robot 508 may include one or more vision sensors 536, which may share various characteristics with vision sensors discussed previously. Images captured by vision sensor(s) may be provided by vision data module 114B to edge inference module 116B. Based on one or more machine learning models stored in edge database 120B, edge inference module 116B may generate one or more inferences 560. Edge inference module 116B may repeatedly generate inferences at each time step of a sequence of time steps $t_1, t_2, \ldots$ as agricultural robot 508 travels through a field. FIG. 5 is a snapshot of one such time step where t=3. Thus, the inference 560 generated by edge inference module 116B is a third inference $t_3$.

In this example, quality metric module 119 determines a quality metric based on a deviation of one or more of the agricultural inferences from a trajectory of agricultural inferences. In this example, for instance, quality metric module 119 uses a time-series (T-S) model 562 such as various types of recurrent neural networks (e.g., LSTM, GRU, etc.) to analyze the trajectory of one or more inferences (e.g., fruit sizes, fruit counts, plant health, pod size, pod color, etc.) to identify any deviations from previously observed trajectories.

Time-series model 562 is depicted in its "unfolded" state at the bottom of FIG. 5, where time-series model 562 is iteratively applied to inputs $x_{t-4}$ to generate outputs $y_{t1-4}$. Between each iteration, an intermediate input $h_i$ that is derived at least in part from a previous iteration i-1 is also applied as an input to time-series model 562, in effect providing time-series model 562 with memory. The input $x_i$ at each iteration i may include, for instance, image(s) captured by vision sensor 536 an inference such as a bounding box drawn around a plant-part-of-interest, a crop count estimate, a bounding box or pixel-wise annotations of a plant disease or pest, other data 124, etc. The output $y_i$ at each iteration i may represent a prediction of what the next inference will be during the next iteration of time-series model 562.

Because FIG. 5 depicts the third iteration at t=3, the output $y_2$, which represents a prediction of what the inference is expected to be during the next iteration t=3, is received by quality metric module 119. Quality metric module 119 can then compare this predicted inference $y_2$ (e.g., a predicted bounding box size) to the actual inference 560 generated by edge inference module 116B during the iteration at t=3. These may differ for multiple reasons. It may be the case that fruit captured by the bounding boxes were eaten or damaged, in which case the bounding box represented by inference 560 may actually be accurate. However, it also may be the case that vision sensor 536 has become un-calibrated, or environmental conditions have changed (e.g., the ground is muddy, making the robot sit lower), in which case parameter adjustment(s) may be in order.

Accordingly, policy module 121 may receive the quality metric, e.g., as part of an overarching state that may or may not include other information, and select action(s) to be performed. These action(s) may include making appropriate adjustments to parameters of robot 508 and/or vision sensor 536. In some implementations, policy module 121 (or quality metric module 119) may generate a probability distribution over a discrete action space, where each action space corresponds to a particular adjustment to vision sensor 536 and/or robot. Policy module may select from those discrete actions based on the probability distribution.

Figure 6:
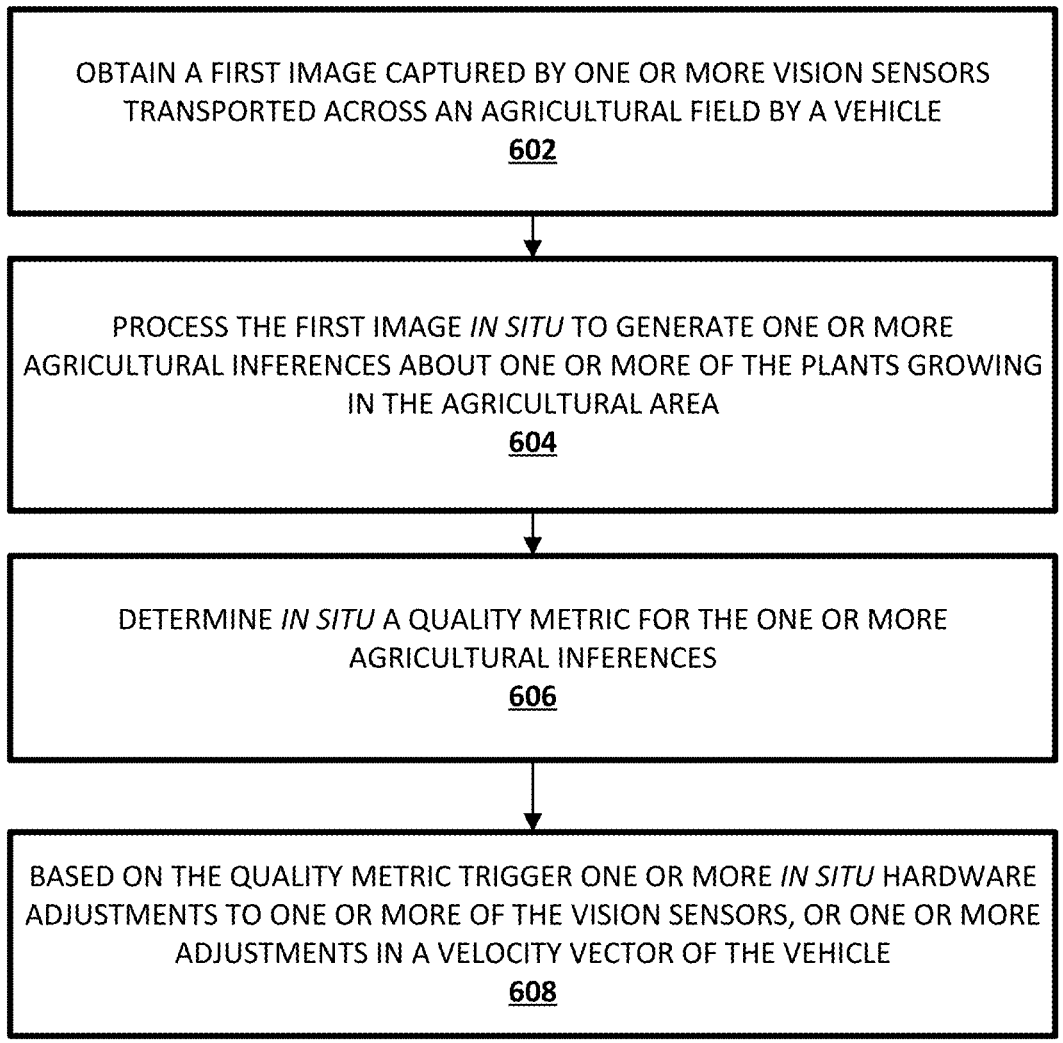
FIG. 6 is a flowchart of an example method in accordance with various implementations described herein.

FIG. 6 illustrates a flowchart of an example method 600 for practicing selected aspects of the present disclosure. Method 600 may be implemented using one or more resource-constrained edge processors (e.g., logic 242 of edge computing node $108_3$/234 that implements edge agricultural inference system 104B) at an edge of a distributed computing network that are remote from one or more central servers (e.g., that implement central agricultural inference system 104A) of the distributed computing network. For convenience, operations of method 600 will be described as being performed by a system configured with selected aspects of the present disclosure. Other implementations may include additional operations than those illustrated in FIG. 6, may perform operation(s) of FIG. 6 in a different order and/or in parallel, and/or may omit one or more of the operations of FIG. 6.

At block 602, the system, e.g., by way of vision data module 114B, may obtain a first image captured by one or more vision sensors transported across an agricultural field by a vehicle, such as farm vehicle $108_2$ or robot 508. In various implementations, the first image may depict one or more plants growing in the agricultural area.

At block 604, the system, e.g., by way of edge inference module 116B, may process the first image in situ to generate one or more agricultural inferences about one or more of the plants growing in the agricultural area. In various implementations, the processing at block 604 may be based on a machine learning model such as a CNN. The inferences generated at block 604 may vary widely depending on any number of factors such as the type of crops, goals of the farmer, time of year, recent climate conditions, market conditions, etc. Non-limiting examples of inferences that may be generated may include detection of plant-parts-of-interest such as fruit, vegetables, nuts, berries, flowers, etc., detection of plant disease such as the crown rust mentioned previously, infestation of pests such as aphids or mites, general plant health, plant hydration, presence/absence/magnitude of various phenotypic traits, estimated counts of plant-parts-of-interest, etc.

At block 606, the system, e.g., by way of quality metric module 119, may determine in situ a quality metric for the one or more agricultural inferences. For example, quality metric module 119 may analyze or even use verbatim one or confidence scores assigned to agricultural inferences generated by edge inference module 116B. Additionally or alternatively, quality metric module 119 may determine whether or how much an agricultural inference drawn by edge inference module 116B deviates from an expected value and/or from a trajectory of expected values. For example, one or more of the agricultural inferences may include a visual annotation that labels a plant feature in the first image. This visual annotation may be, for instance, a bounding box or pixel-wise annotation of the feature. In various implementations, quality metric module 119 may determine the quality metric based on a spatial dimension of the visual annotation, e.g., whether the height or width (or estimated mass) deviates from an expected spatial dimension of the plant feature. Additionally or alternatively, in some implementations, a general metric of image quality may be determined, e.g., using a machine learning model or other algorithm that is design to assign a general image quality score to images based on factors such as focus (or lack thereof), brightness (or lack thereof), noise, etc.

As the vehicle continues to travel across the agricultural field, and based on the quality metric, at block 608, the system, e.g., by way of policy module 121, may trigger, in situ, one or more hardware adjustments to one or more of the vision sensors, or one or more adjustments in operation of the vehicle. In the former case, the hardware adjustments may include, for instance, an adjustment of, an optical zoom of one or more of the vision sensors a framerate of one or more of the vision sensors, an aperture size of one or more of the vision sensors, and/or an exposure speed of one or more of the vision sensors, to name a few.

Adjustments to operation of the vehicles may include, for instance, an adjustment to a velocity vector of the vehicles. Adjustments to velocity vectors may include, for instance, a reduction in speed (e.g., to obtain higher-resolution images), a change in direction, a stopping and reversing of the vehicle, and so forth. In instances where the vehicle stops and reverses, the system may, where applicable, trigger one or more adjustments to a given vision sensor of the one or more vision sensors, and then cause a vision sensor to capture a new image subsequent to the stopping and reversing of the vehicle. The new image may depict one or more of the same plants that were previously depicted growing in the agricultural area, except with better quality. This new image may be processed in some implementations based on the same machine learning model as was used at block 604 to generate one or more updated agricultural inferences about one or more of the plants growing in the agricultural area.

Figure 7:
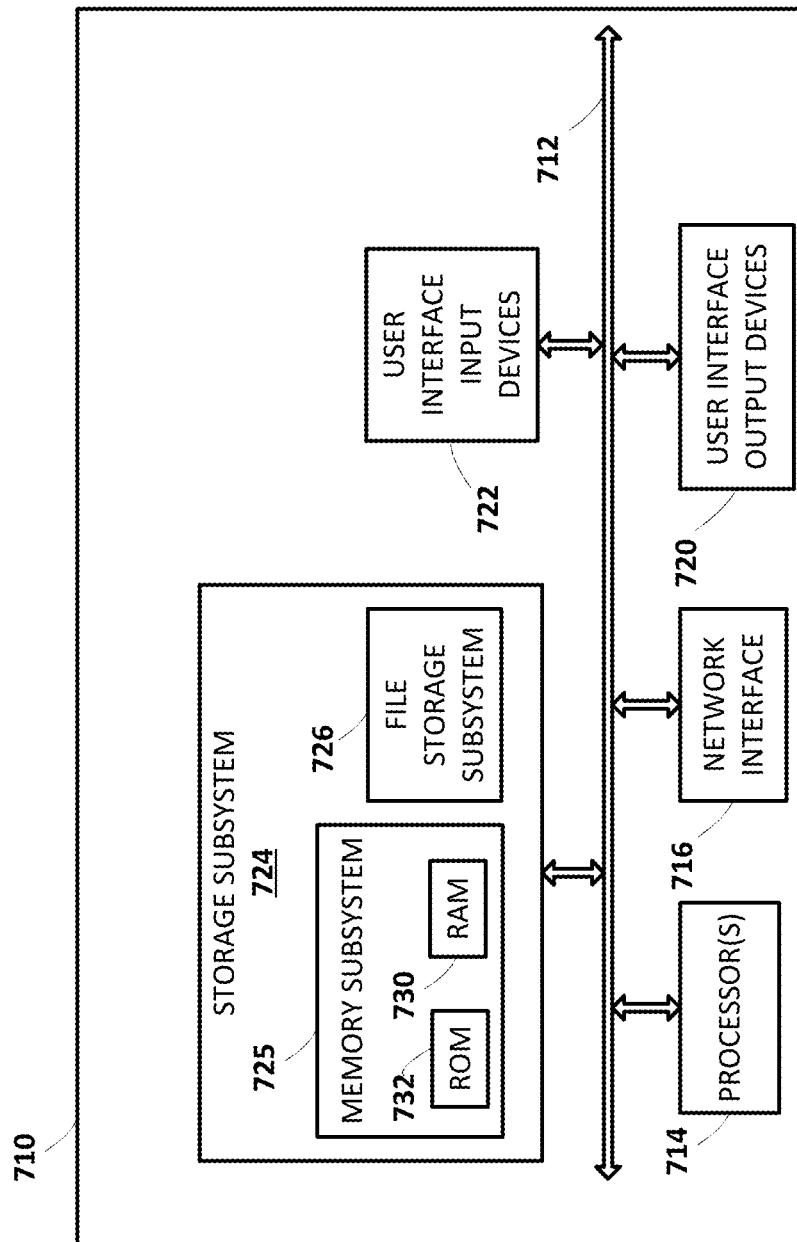
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing device 710 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 710 or onto a communication network.

User interface output devices 720 may include a display subsystem, a printer, a fax machine, or non-visual displays such as audio output devices, haptic feedback devices, etc. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method 600 described herein, as well as to implement various components depicted in FIGS. 1, 2, 4, and 5.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more edge computing devices, the method comprising:
   obtaining, by one or more of the edge computing devices, a first image captured by one or more vision sensors transported across an agricultural field by a vehicle, wherein the first image depicts one or more plants growing in an agricultural area;
   processing, by one or more of the edge computing devices, the first image to generate one or more agricultural inferences about one or more of the plants growing in the agricultural area, wherein the processing is based on a machine learning model;
   determining, by one or more of the edge computing devices, a quality metric for the one or more agricultural inferences using one or more of the edge computing devices, wherein the quality metric appraises or quantifies a value or reliability of one or more of the inferences; and
   while the vehicle continues to travel across the agricultural field, and based on the quality metric:
      triggering, by one or more of the edge computing devices, one or more hardware adjustments to one or more of the vision sensors, or triggering, by one or more of the edge computing devices, an adjustment in an operation of the vehicle.

2. The method of claim 1, wherein one or more of the agricultural inferences includes a visual annotation that labels a plant feature in the first image, and the quality metric is determined based on a spatial dimension of the visual annotation.

3. The method of claim 2, wherein the quality metric is determined based on a deviation of the spatial dimension from an expected spatial dimension of the plant feature.

4. The method of claim 1, wherein the one or more edge computing devices are mounted on or integral with the vehicle.

5. The method of claim 1, wherein the quality metric is determined based on a deviation of one or more of the agricultural inferences from a trajectory of agricultural inferences.

6. The method of claim 5, wherein the deviation from the trajectory is determined based on a recurrent neural network.

7. The method of claim 1, wherein the one or more vision sensors comprises a stereoscopic camera, and one or more of the hardware adjustments includes altering an interaxial distance between lenses of the stereoscopic camera.

8. The method of claim 1, wherein one or more of the hardware adjustments includes an adjustment of:
   an optical zoom of one or more of the vision sensors;
   a framerate of one or more of the vision sensors;
   an aperture size of one or more of the vision sensors; or
   an exposure speed of one or more of the vision sensors.

9. The method of claim 1, wherein the adjustment in the operation of the vehicle comprises a reduction in speed.

10. The method of claim 1, wherein the adjustment in the operation of the vehicle comprises stopping and reversing the vehicle, and wherein the method further includes:
    triggering one or more adjustments to a given vision sensor of the one or more vision sensors;
    obtaining a second image captured by the given vision sensor subsequent to the stopping and reversing of the vehicle, wherein the second image depicts one or more of the same plants growing in the agricultural area; and
    processing the second image based on the machine learning model to generate one or more updated agricultural inferences about one or more of the plants growing in the agricultural area.

11. An edge computing device comprising memory and one or more processors, wherein the memory stores instructions that, in response to execution by the one or more processors, cause the one or more processors to:
    obtain a first image captured by one or more vision sensors transported across an agricultural field by a vehicle, wherein the first image depicts one or more plants growing in an agricultural area;
    process the first image to generate one or more agricultural inferences about one or more of the plants growing in the agricultural area, wherein the processing is based on a machine learning model;
    determine a quality metric for the one or more agricultural inferences using one or more of the edge computing devices, wherein the quality metric appraises or quantifies a value or reliability of one or more of the inferences; and
    while the vehicle continues to travel across the agricultural field, and based on the quality metric:
       trigger one or more hardware adjustments to one or more of the vision sensors, or
       trigger an adjustment in an operation of the vehicle.

12. The edge computing device of claim 11, wherein one or more of the agricultural inferences includes a visual annotation that labels a plant feature in the first image.

13. The edge computing device of claim 12, wherein the quality metric is determined based on a spatial dimension of the visual annotation.

14. The edge computing device of claim 13, wherein the quality metric is determined based on a deviation of the spatial dimension from an expected spatial dimension of the plant feature.

15. The edge computing device of claim 11, wherein the quality metric is determined based on a deviation of one or more of the agricultural inferences from a trajectory of agricultural inferences.

16. The edge computing device of claim 15, wherein the deviation from the trajectory is determined based on a recurrent neural network.

17. The edge computing device of claim 11, wherein the one or more vision sensors comprises a stereoscopic camera, and one or more of the hardware adjustments includes an alteration of an interaxial distance between lenses of the stereoscopic camera.

18. The edge computing device of claim 11, wherein one or more of the hardware adjustments includes an adjustment of:
    an optical zoom of one or more of the vision sensors;
    a framerate of one or more of the vision sensors;
    an aperture size of one or more of the vision sensors; or
    an exposure speed of one or more of the vision sensors.

19. A non-transitory computer-readable medium comprising instructions that, in response to execution of the instructions by a processor of an edge computing device, cause the processor to:
    obtain a first image captured by one or more vision sensors transported across an agricultural field by a vehicle, wherein the first image depicts one or more plants growing in an agricultural area;
    process the first image to generate one or more agricultural inferences about one or more of the plants growing in the agricultural area, wherein the processing is based on a machine learning model;
    determine a quality metric for the one or more agricultural inferences using one or more of the edge computing devices, wherein the quality metric appraises or quantifies a value or reliability of one or more of the inferences; and
    while the vehicle continues to travel across the agricultural field, and based on the quality metric:
       trigger one or more hardware adjustments to one or more of the vision sensors, or
       trigger an adjustment in an operation of the vehicle.

20. The non-transitory computer-readable medium of claim 19, wherein one or more of the agricultural inferences includes a visual annotation that labels a plant feature in the first image.

* * * * *